United States Patent [19]

Rezmer

[11] Patent Number: 4,903,630
[45] Date of Patent: Feb. 27, 1990

[54] ANIMAL WARNING ALARM
[75] Inventor: Leonard Rezmer, Kawkawlin, Mich.
[73] Assignee: Game Tracker, Flushing, Mich.
[21] Appl. No.: 226,793
[22] Filed: Aug. 1, 1988
[51] Int. Cl.⁴ .............................. B06B 1/00; G08B 3/00
[52] U.S. Cl. .............................. 116/22 A; 116/137 R; 116/28 R; 116/62.3
[58] Field of Search ...................... 116/67 R, 22 A, 70, 116/137 R, 137 A; 248/288.3, 288.5

[56] References Cited
U.S. PATENT DOCUMENTS

| | | | |
|---|---|---|---|
| 1,369,722 | 2/1921 | Ames | 248/288.5 |
| 1,377,355 | 5/1921 | Knapp | 248/288.3 |
| 2,750,919 | 6/1956 | Pearson | 116/67 R |
| 4,437,428 | 3/1984 | Hoffelner | 116/22 A |
| 4,633,715 | 12/1986 | Anders et al. | 116/173 |

Primary Examiner—William A. Cuchlinski, Jr.
Assistant Examiner—Jeffrey J. Hohenshell
Attorney, Agent, or Firm—Arnold S. Weintraub; William D. Blackman

[57] ABSTRACT

An ultrasonic whistle apparatus for mounting on a vehicle to warn animals of the approach of the vehicle is disclosed, comprising (a) a funnel to direct air into the apparatus and having an air path therein, (b) an ultrasonic whistle mounted in the air path in the funnel and adapted to be actuated by air passing therethrough, (c) a base for mounting the apparatus to a vehicle, and (d) an adjustment mechanism connecting the funnel to the base including a ball and socket joint for adjusting the direction in which the funnel is oriented, the funnel adjustable in more than one plane of adjustment.

5 Claims, 1 Drawing Sheet

U.S. Patent
Feb. 27, 1990
4,903,630
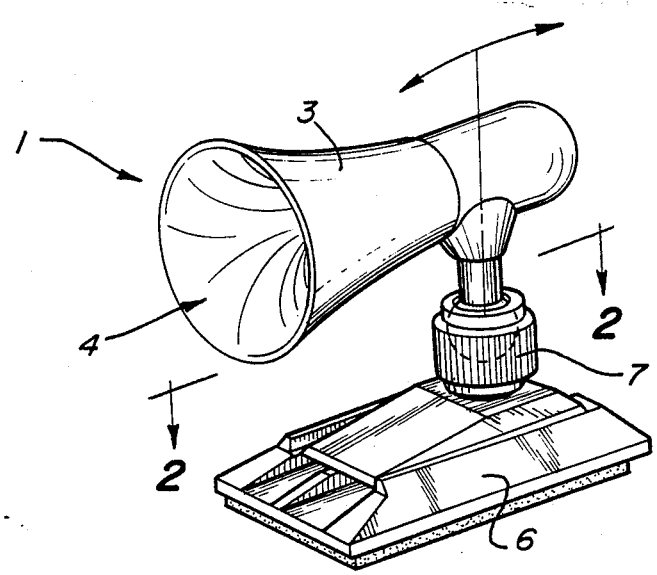
_Fig-1_
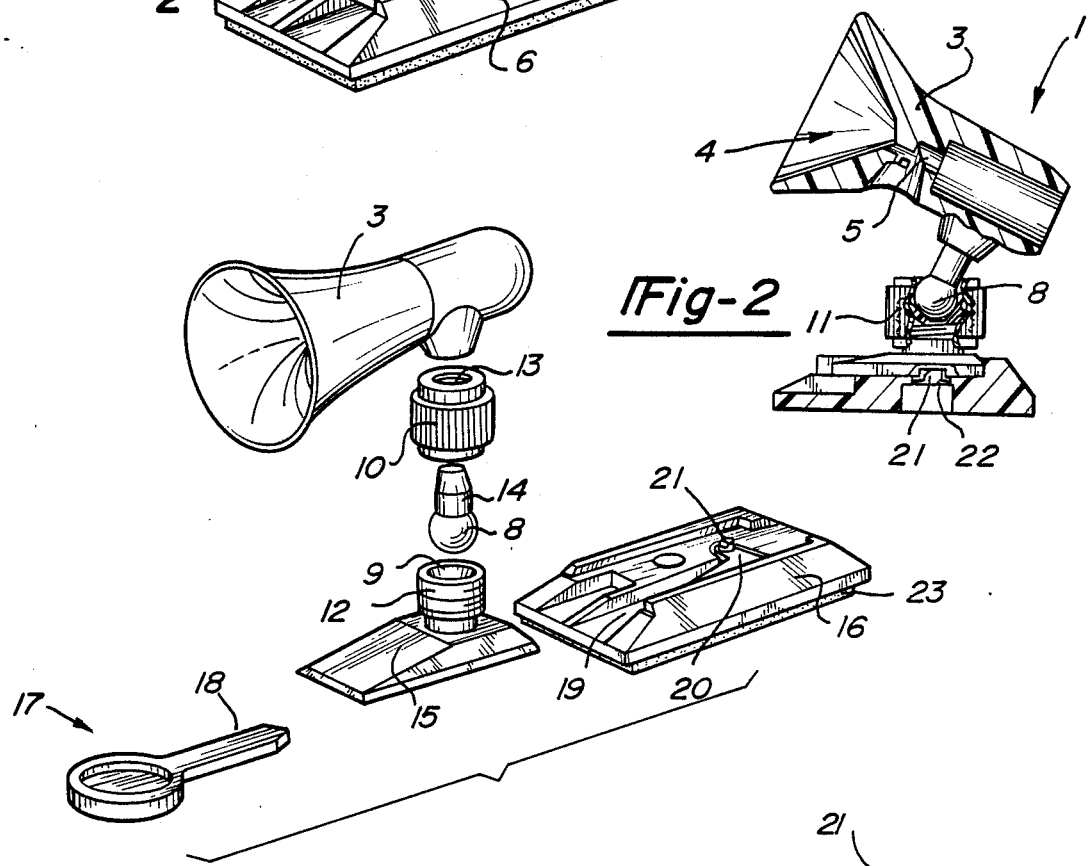
_Fig-2_
_Fig-3_
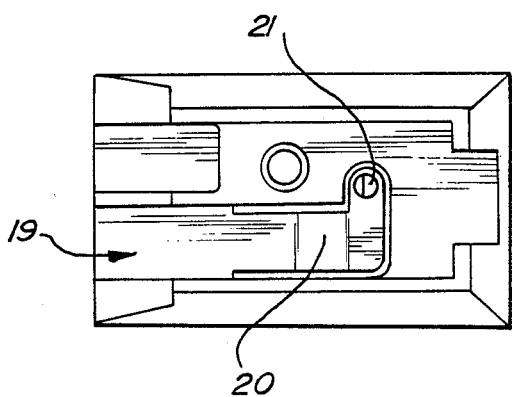

ANIMAL WARNING ALARM

BACKGROUND OF THE INVENTION

1. Field of the Invention

The present invention relates generally to devices to warn animals of an oncoming vehicle. More particularly, the present invention relates to an ultrasonic whistle apparatus for mounting on a vehicle to warn animals of the approach of the vehicle, the apparatus being adjustable to any orientation so that it may be pointed directly into the wind for maximum effectiveness.

2. Description of the Relevant Art

Many animals, both wild and domesticated, are killed in unfortunate accidents on our roadways each year. Warning devices to alert animals to the presence of an oncoming vehicle are some help in preventing these deaths, but heretofore have not been as effective as would be preferable. The best and simplest of the known devices to warn animals of an oncoming vehicle consist of ultrasonic whistles which can be mounted on a vehicle either on the bumper or other convenient place. Unfortunately, these prior art devices were either not adjustable in any fashion, or were adjustable only in one plane. The wind is one variable factor that ideally should be compensated for in the use of such a device. A second factor which is helped by adjustability is the fact that today's multitudinous vehicles come in a variety of shapes and sizes, and a whistle apparatus which mounts with a good orientation towards the wind on one vehicle will not mount as conveniently on a second vehicle, simply because of the geometry of the available mounting surfaces.

Ideally, such an ultrasonic whistle apparatus would be adjustable so as to point in any direction, so that it could be adjusted to face directly into the wind and also so that differing mounting surfaces could be compensated for. In addition, an ideal ultrasonic whistle apparatus would be removable from the vehicle in the event that the vehicle was to go through an automatic car wash, or for storage and protection purposes.

SUMMARY OF THE INVENTION

The present invention provides an apparatus for attaching to a vehicle which is easily adjustable to position in an optimum orientation for both the wind conditions and the vehicle mounting configuration, and provides an ultrasonic whistle apparatus to warn animals, both wild and domestic, of the approach of an oncoming vehicle. The present invention provides an ultrasonic whistle apparatus for mounting on a vehicle to warn animals of the approach of the vehicle, comprising (a) a funnel to direct air into the apparatus and having an air path therein, (b) an ultrasonic whistle mounted in the air path in the funnel and adapted to be actuated by air passing therethrough, (c) a base for mounting the apparatus to a vehicle, (d) an adjustment means connecting the funnel to the base, the adjustment means comprising means for adjusting the direction in which the funnel is oriented, the means adjustable in more than one plane of adjustment. The adjustment means preferably allows for an infinite number of orientations of the funnel and rotation thereof a full 360°, and may comprise a ball and socket operatively connected to the funnel, and means for disengagably locking the funnel portion into any given orientation. Part of the base may be disengagable and detachable from the adjustment means to allow for temporary removal of the apparatus from a vehicle. The means for disengageably locking the funnel may include a first sleeve which threadably engages with a second sleeve, the first sleeve being hollow and having a circular opening in the top thereof, the second sleeve containing the socket of the adjustment means, the ball of the adjustment means having a post attached thereto of a smaller diameter than that of the ball, the end of the post opposite the ball being attached to the funnel, the diameter of the post being of substantially the same size as the diameter of the opening in the first sleeve.

In a second embodiment, the base comprises a spring section and a socket section slidably engagable with the spring section and may comprise a key for allowing movement of the socket section in the spring section, the key having a substantially parallelepiped operative end, the spring section having a groove therein which receives the operative end of the key, the groove having a spring therein which is biased upwardly and has a button on its terminal portion, the socket section having a recess therein which retentively receives the button, whereby the operative end of the key may be inserted into the groove thus pushing the spring downwardly to disengage the button from the recess and to enable the socket section to be slidably engaged with or disengaged from the spring section.

BRIEF DESCRIPTION OF THE DRAWINGS

FIG. 1 is a perspective view of a preferred embodiment of the present invention, showing the ball for adjustment in phantom.

FIG. 2 is a side view of the embodiment of FIG. 1, showing a cutaway of the ball and socket for adjustment and also a cutaway of the whistle section, and another cutaway of the button and recess locking mechanism.

FIG. 3 is an exploded view of the embodiment of FIG. 1, showing the key for disengaging the socket section from the spring section, and showing the button for locking the two sections together.

FIG. 4 is a top view of the spring section showing the spring and button for retentively engaging the socket section.

DETAILED DESCRIPTION OF THE PREFERRED EMBODIMENT

Throughout the following description and drawing an identical reference number is used to refer to the same component shown in multiple figures of the drawing.

The present invention comprises an ultrasonic whistle apparatus for mounting on a vehicle to warn animals of the approach of the vehicle, shown generally at 1 which has a funnel 3 which defines an air path 4 for housing an ultrasonic whistle 5. The whistle is of conventional design, as will be appreciated by those skilled in the art. The whistle in use is actuated by air passing through the air path 4 and thereby through the whistle 5. The apparatus has a base 6 for mounting the apparatus to a vehicle, and an adjustment means 7 connecting the funnel 3 to the base 6. The adjustment means 7 comprises means for adjusting the direction in which the funnel 3 is oriented, the means adjustable in more than one plane of adjustment. A part of base 6 is disengagable and detachable from adjustment means 7 to allow for temporary removal of the apparatus from a vehicle, as will be described more fully herein. In the preferred embodiment of the present invention, the adjustment means 7 contains a ball 8 and socket 9 to allow for optimal orientation of the funnel 3 to account for differing wind conditions and various mounting surfaces. This ball 8 and socket 9 allows the funnel 3 to be rotated a full 360°, as well as allowing for an infinite number of orientations of funnel 3.

After adjustment, the funnel 3 is locked into place by means for locking the funnel 3 into any given orientation, which may include first sleeve 10 which is a hollow cylinder having a cylindrical opening 13 in the top thereof, and is threaded which internal threads as shown at 11 and threadably engages with second sleeve 12 which is on base 6 and defines socket 9 of adjustment means 7 on the inside thereof. Ball 8 is attached to a post 14 having a smaller diameter than that of ball 8. The end of post 14 opposite ball 8 is mounted or attached to the funnel 3 by any suitable means known to those in the art, e.g. glue, roll pin, etc. Post 14 has a diameter substantially the same size as the diameter of cylindrical opening 13 in sleeve 10. Therefore, the ball 8 will not pass through cylindrical opening 13.

Referring now to FIGS. 2, 3, and 4, the base 6 in one embodiment may include an upper spring section 16 and a lower socket section 15 which is slidably engagable with spring section 16 so that the socket section 15 with funnel portion 3 attached may be removed for storage or movement of the vehicle through a car wash. For use in engagement and disengagement of the socket section 15 with the spring section 16, a key 17 having a substantially parallelepiped operative end 18 is used to slide into a groove 19 in spring section 16 to push down on spring 20 which normally is biased in an upward direction and has a button 21 on its terminal portion, thereby disengaging button 21 from recess 22 in the socket section 15 allowing for slidable movement of socket section 15 in spring section 16. The preferred embodiment of the present invention has an adhesive pad 23 or other type of adhesive material attached to the bottom of base 6 for mounting the apparatus to a vehicle.

Having, thus, described the invention what is claimed is:

1. An ultrasonic whistle apparatus for mounting on a vehicle to warn animals of the approach of the vehicle, comprising in combination:
  (a) a funnel for directing air into the apparatus and having an air path therein;
  (b) an ultrasonic whistle mounted in the air path in the funnel and adapted to be actuated by air passing therethrough;
  (c) a base for mounting the apparatus to a vehicle comprising:
    (1) a spring section having a groove formed therein for slidably receiving a key, the spring section comprising a spring disposed in the groove which is based upwardly and which has a button on an uppermost portion thereof;
    (2) a socket section which is slidably engagable in the spring section and which has a lower surface with a recess formed therein which retentively receives the button therein to disengagably retain the socket section in the spring section;
  (d) a key for disengaging the socket section from the spring section, the key having a substantially parallelepiped operative end, whereby the operative end of the key may be slidably inserted into the groove, thus pushing the spring downwardly to disengage the button from the recess and enable the socket section to be slidably disengaged from the spring Section, and
  (e) an adjustment means connecting the funnel to the base; the adjustment means comprising means for adjusting the direction in which the funnel is oriented, said adjustment means being adjustable in more than one plane of adjustment.

2. The apparatus of claim 1, wherein;
the adjustment means allows for an infinite number of orientations of the funnel and rotation thereof a full 360°.

3. The apparatus of claim 2, wherein;
the adjustment means comprises a ball and socket operatively connected to the funnel, and means for disengagably locking the funnel into a given orientation.

4. The apparatus of claim 3, wherein the means for disengagably locking includes a first sleeve which threadably engages with a second sleeve;
  the first sleeve being hollow and having a circular opening in the top thereof;
  the second sleeve containing the socket of the adjustment means;
  the ball of the adjustment means having a post attached thereto of a smaller diameter than that of the ball, the end of the post opposite the ball being attached to the funnel;
  the diameter of the post being of substantially the same size as the diameter of the opening in the first sleeve.

5. The apparatus of claim 1, further comprising an adhesive material attached to the underside of the base, for mounting the apparatus to a vehicle.

* * * * *